Patented Feb. 14, 1928.

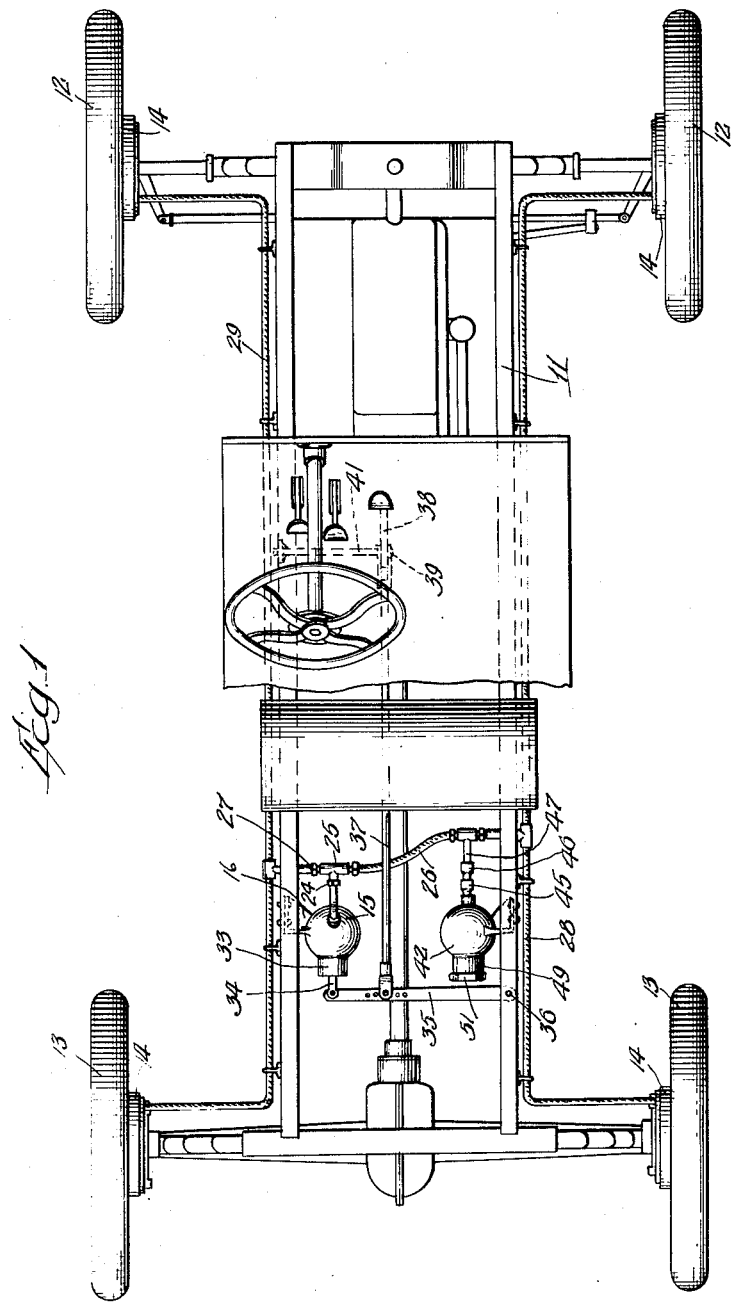

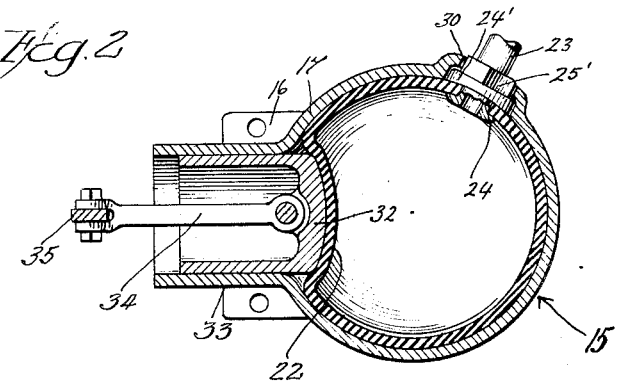
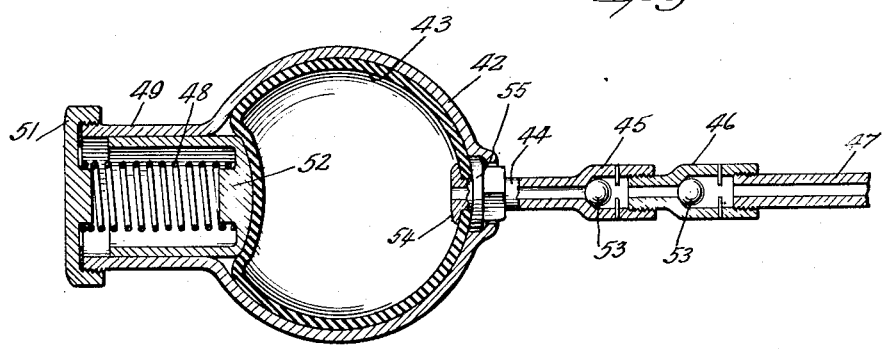
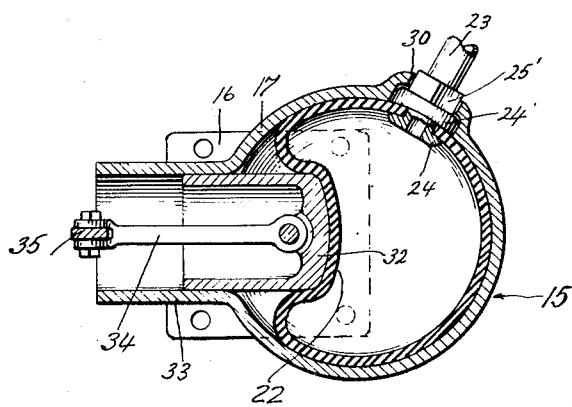

1,659,034

UNITED STATES PATENT OFFICE

BERT A. LINDERMAN, OF NEW YORK, N. Y., ASSIGNOR TO LINDERMAN & CO., OF WILMINGTON, DELAWARE, A CORPORATION OF DELAWARE.

FLUID-PRESSURE BRAKE SYSTEM

Application filed June 22, 1925. Serial No. 38,702.

This invention relates to braking mechanism for automobiles and the like, and more particularly to braking systems adapted to be operated by fluid pressure, the apparatus shown on the drawings being particularly adapted, though not limited, to a hydraulic pressure system.

An important object of the invention is the provision of a fluid pressure braking system of simplified construction and increased efficiency.

Still another object of my invention resides in providing a completely, hermetically sealed system, which includes an expansible tubular body of non-metallic, resilient material, such as a rubber containing material or the like, located at the brake segments, which hollow body has its walls rigidly reinforced in all directions, except those portions adjacent the brake segments, so that when the tubular body is inflated the brake segments are shifted, and in addition a main, expansible body of similar material hermetically connected to said first hollow body, so as to seal a pressure fluid therein and to provide an absolutely hermetic system to preclude the loss or evaporation content in said pressure system, said main hollow body likewise having its inner walls rigidly reinforced by a housing, a portion of which wall reinforcing means is adapted to be shifted for causing the collapsing of the main hollow body, whereby to bring about an expulsion of pressure from said main hollow body to said first hollow body to inflate the latter and apply the brakes.

Another object of my invention resides in the provision of automatic means connected to such a beforementioned system for maintaining a predetermined pressure in such hermetic system.

A further object of the invention is to provide an improvement in fluid pressure braking mechanism adapted to facilitate the operation of the foot pedal, or other control, so that the same may be operated with a uniform, short stroke, regardless of the condition of wear of the brakes.

Another object is the provision, in a braking system of this character, of an improved diaphragm construction in the pressure controlling device.

A further and important object of the invention is the provision of a reserve pressure device and automatic control therefor adapted to accomplish the result last above stated and involving few and inexpensive parts, easily installed and requiring no adjustment or attention after installation.

Other objects and advantages of the invention will be apparent as it is better understood from the following description, which, taken in connection with the accompanying drawings, discloses a preferred embodiment thereof.

Referring to the drawings,

Figure 1 is a plan view, partly diagrammatic, of an automobile chassis equipped with a fluid pressure braking system embodying my invention;

Fig. 2 is a longitudinal sectional view of the diaphragm pressure device;

Fig. 3 is a similar view, showing a different position of the diaphragm; and

Fig. 4 is a sectional view of the pressure reservoir and automatic control for maintaining the proper residual pressure in the system.

On said drawings, I have shown, for illustrative purposes only, an apparatus in which the reference character 11 indicates an automobile frame and the characters 12 and 13 indicate, respectively, the front and rear wheels, all four of which, in the present instance, are provided with brakes 14, which may be of the type shown and described in my prior application, Serial No. 753,085, filed December 1, 1924. This construction is also shown in my prior Patent #1,601,974 granted October 5, 1926 to which reference is made for a further description thereof.

The pressure medium is adapted to be supplied to the inflatable tubes of said brakes from a diaphragm control 15, which is shown in section in Fig. 2. Said control comprises a spherical casting 17 having an attaching bracket 16 formed integrally therewith, which casting provides a rigid reinforcing means in the nature of a housing for a diaphragm 22, which, in accordance with my invention, is in the form of a collapsible, hollow body, substantially ball-shaped and composed of non-metallic, resilient material, preferably rubber or rubberized fabric, such, for instance, as the material from which tennis balls are made. The interior of said ball is communicably connected by a short pipe, or hose, 23 with a T 25 and through branches 26 and 27 with conduits 28 and 29 at opposite sides of the frame leading to the brakes at the four wheels. The connection 23 is held in place by a flange 24 on the interior of the ball diaphragm 22 and by a washer 24′ on the exterior of said diaphragm, said washer having a square head 25′ disposed in an opening 30 in the housing 17 to prevent turning of said connection 23, the opposite end of which is threaded or otherwise secured to the T 25.

A plunger 32 is slidably mounted in a cylindrical rearward extension 33 of the member 17 and is connected by a link 34 with a lever 35 pivoted at its opposite end at 36 to the frame 11 and being adapted to be actuated by a rod 37 adjustably connected thereto and being connected at its opposite end to a foot lever 38 at the driver's position, said lever being pivoted at 39 to a rod 41 extending inwardly from the frame.

Actuation of the foot lever collapses the hollow body diaphragm 22, as shown in Fig. 3, and it will be evident that ample clearance is provided at both sides, thus avoiding any buckling or pinching of the diaphragm. The wall of the ball has a rolling action on the interior of the member 17, which prevents undue wear of any part thereof, such as would occur if the diaphragm were clamped in place in such manner as to have a hinging, instead of a rolling action in operation. It will also be evident that, due to the rigidity of the casting 17 and the fact that it contacts with the entire outer wall surface of the hollow body, when a portion of the wall 22 is collapsed the fluid therein is forced through the conduit 23. This result is effected by preventing deformation of the wall 22 at any other point than that at which the collapsing force is exerted, and this is accomplished by the rigid enclosure 17 and also by the non-metallic, resilient material of which the hollow body is composed.

For the purpose of automatically maintaining in the system a residual pressure sufficient to permit application of the brakes at all times by a uniform, short stroke of the foot lever, I provide a reservoir 42, containing a bulb 43, similar to the ball diaphragm 22 shown in Figs. 2 and 3, and communicably connected by a connection 44, two one-way valves 45 and 46 and a conduit 47 with the branch 26 of the pressure distribution system. A spring 48, housed in a rearward extension 49 of the reservoir 42, bears at one end on a cap 51 and at the opposite end on the head 52 of a slidable member 52′ bearing against the bulb 43. The tension of this spring is sufficient to unseat the movable balls 53 of the valves 45 and 46 when the pressure in the system falls below a predetermined value, due to wear of the brakes, or other changing conditions. It is, therefore, unnecessary to increase the pedal stroke, even though the brakes should become badly worn and the stroke may be short enough to be within practical limits of leverage and adapted for operation by relatively light pressure from the foot of the driver. The member 44 may be held in place by means of an end flange 54 and a washer 55, similar to the construction heretofore described with reference to the connection 23.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A diaphragmatic pressure device for a fluid pressure braking system for automobiles wherein the brake mechanism is provided with an inflatable member containing pressure fluid for operating the brake mechanism, said device comprising a collapsible, hollow body of non-metallic, resilient material containing fluid and connecting with said inflatable member so as to form a sealed system hermetically enclosing the fluid in said members, a casing for said body constructed and arranged to form a rigid backing for the entire peripheral wall of said body and means for causing a portion of said casing to collapse said body to expel fluid therefrom whereby to cause fluid to flow into said inflatable member to operate the brake mechanism.

2. A pulsator for a brake comprising a collapsible, hollow rubber body adapted to contain fluid and adapted to be hermetically connected to an inflatable member of a sealed fluid containing braking system, means for pressing against a portion of the wall of said hollow body to partially collapse the same, and means for rigidly reinforcing all other wall portions of said hollow body whereby to cause the expulsion of liquid therefrom and into said system to shift the brake.

3. A pulsator for a brake comprising a collapsible hollow body of resilient material adapted to contain fluid and adapted to be hermetically connected to an inflatable member of a sealed fluid containing braking system and rigid means contacting with the entire outer walls of the hollow body and means for shifting a portion of said contacting means partially to collapse the hollow body to expel fluid therefrom into the system to operate the brake.

4. A pulsator for a brake comprising a collapsible, hollow body adapted to contain fluid and adapted to be hermetically connected to an inflatable member of a sealed fluid containing braking system, a rigid casing completely enclosing said hollow body and contacting with the outer walls thereof except at a predetermined peripheral portion, and a plunger having a rigid face contacting with such peripheral portion, and means for moving said plunger against said peripheral portion whereby to collapse said hollow body to expel the fluid therefrom in said system to operate the brake.

BERT A. LINDERMAN.